United States Patent [19]

Karube et al.

[11] 4,015,181

[45] Mar. 29, 1977

[54] DC MOTOR

[75] Inventors: Yukuo Karube; Koji Suzuki, both of Yokohama; Ryoichi Ezaki, Tokyo, all of Japan

[73] Assignees: Canon Kabushiki Kaisha; Canon Seiki Kabushiki Kaisha, both of Tokyo, Japan

[22] Filed: June 16, 1975

[21] Appl. No.: 586,926

[30] Foreign Application Priority Data

June 18, 1974 Japan .............................. 49-69489
July 22, 1974 Japan .............................. 49-83960
July 22, 1974 Japan .............................. 49-83961

[52] U.S. Cl. .............................. 318/325; 318/439
[51] Int. Cl.² .............................. H02P 5/08
[58] Field of Search .......... 318/138, 325, 437, 438, 318/439

[56] References Cited

UNITED STATES PATENTS

| | | | |
|---|---|---|---|
| 2,748,333 | 5/1956 | Lee | 318/325 X |
| 2,933,669 | 4/1960 | Clade | 318/325 |
| 3,329,878 | 7/1967 | Von Esch | 318/325 |
| 3,531,669 | 9/1970 | Samuta | 318/325 X |
| 3,584,283 | 6/1971 | Lindner | 318/325 |

*Primary Examiner*—Robert K. Schaefer
*Assistant Examiner*—W. E. Duncanson, Jr.
*Attorney, Agent, or Firm*—Fitzpatrick, Cella, Harper & Scinto

[57] ABSTRACT

In a DC motor is provided with a revolving armature with an armature core having a plurality of salient poles and formed of soft magnetic material. Armature windings are coiled on the salient poles of the core, a commutator having a plurality of segments is electrically connected to the windings, and a centrifugal governor device is electrically connected in the current flow path to the windings. The governor switches of the governor device for controlling the speed of revolution of the revolving armature are provided between the salient poles of the armature core. A governor base for holding the governor switches has connecting terminal members for the governor switches and is disposed with respect to the armature windings on the same side that the commutator is disposed. Thereby, during assembly of the revolving armature, the procedures of connecting the governor switches to the current flow path of the windings are pronouncedly simplified as compared with the prior art motors. Moreover, during operation of the motor, the governor switches are operable to be opened and closed in a plane containing the axis of the rotary shaft of the revolving armature so that control of the speed of revolution of the armature can be effected with high accuracy irrespective of the direction of revolution. Further, in the motor of the characteristic construction as described, a printed distributing board having electrical elements connected between the commutator segments and between the governor switch contacts, together with the commutator and the governor base, can be installed in a bunch on one side of the armature's rotary shaft in the axial direction thereof, thus greatly simplifying the procedures of making connections between the electrical parts.

18 Claims, 19 Drawing Figures

DC MOTOR

BACKGROUND OF THE INVENTION

1. Field of the Invention

This invention relates to a DC motor, and more particularly to a DC motor provided with a centrifugal governor device for controlling the speed of revolution of such motor.

2. Description of the Prior Art

Various types of DC motors provided with a governor device for controlling the speed of revolution have heretofore been proposed. Among these, a relatively popular type is that in which the governor switches of the governor device are designed to opened and closed by centrifugal force in a plane perpendicular to the axis of the rotary shaft of the motor. In a motor provided with such a governor device, however, the force acting on the governor switches is not constant and particularly so when the direction of revolution of the motor is changed, and this is a disadvantage in that the controlled speed of revolution cannot be made always constant irrespective of the direction of revolution of the motor. Also, the governor device has been disposed at a location spaced apart with respect to the armature coils in the axial direction of the rotary shaft and this has prevented reduction in size of the motor and also led to a disadvantage in that cumbersome procedures are involved in making connections between electrical parts during assembly of the motor. This last-mentioned disadvantage has particularly been pronounced in a motor wherein the governor device is disposed with respect to the armature coil on the opposite side from that side on which the rectifier is disposed and spark extinguishing electrical elements are connected between the segments of the commutator and between the governor switch contacts.

To eliminate the above-noted disadvantages which have existed in a motor provided with a governor device operable in the plane perpendicular to the axis of the rotary shaft, there has heretofore been proposed a motor provided with a governor device operable in a plane containing the axis of the rotary shaft. A first example of such motor is that in which three cylindrical weight members are inserted radially with respect to the rotary shaft and between coils comprising windings provided on three cores arranged symmetrically and radially and the rotary shaft is secured by means of resilient member with respect to the opposite side from that side on which the commutator is disposed. Screw members are threaded into the respective weight members from the back surfaces thereof and radially with respect to the rotary shaft. First silver contacts are joined to the tip ends of the screw members while second silver contacts are joined to the tip ends of conductor pieces exposed outwardly of the segments of the commutator. The second silver contacts are opposed to the first silver contacts. A second example is a motor in which one or more of the armature poles are auxiliary poles having no winding thereon. Such auxiliary poles are formed with holes parallel to the rotary shaft, in which holes are mounted governor switches having movable contacts and fixed contacts operable to open and close in a plane containing the axis of the rotary shaft.

Any of these motors heretofore proposed has involved special connections for the commutator and the armature core, which in turn has complicated the construction of the armature itself and thus offered various problems in practice.

For instance, in the above-mentioned first example of the motor, additional conductor pieces must be provided to the commutator segments and inconveniently, special connecting procedures are involved in connecting spark extinguishing electrical elements between the commutator segments and between the governor switches. In the second example of the motor, one or more auxiliary poles having no winding must be provided among the armature poles and holes must be formed through such auxiliary poles. Also, when there are three armature poles one of which provides the auxiliary pole, four special, dimensionally irregular, commutator segments including two smaller segments are required for connecting the governor switches and some special connecting method must be adapted between electrical parts.

All of the motors heretofore proposed are of special designs that will cause the prior art motors to be greatly reformed. This might lead to disadvantages such as much more complicated procedures of assembly and wiring, and higher cost of manufacture.

SUMMARY OF THE INVENTION

In view of the above-noted situations, an object of the present invention is to provide a novel DC motor which can eliminate all of the various problems peculiar to the prior art DC motors which have been described above.

Another object of the present invention is to provide a novel DC motor which is reduced in size and ensures the same controlled speed of revolution both during normal and reverse rotation and which can easily be manufactured with electrical connections between the commutator and the armature windings, and further between them and the governor device, being particularly simplified.

Still another object of the present invention is to construct the above-described motor such that the governor switches are operable to open and close in a plane containing the axis of the rotary shaft, and such that the electrical connections between the governor switches and the commutator segments and the armature can be made only on one side of the rotary shaft of the armature core, in the axial direction thereof.

In particular connection with the above objects, according to a preferred embodiment of the present invention, the governor switches are disposed within the spaces defined between the salient poles of the armature core, and means for holding the governor switches is disposed with respect to the core and in proximity to the commutator on the same side that the commutator is disposed, and thus, the above-mentioned objects may be achieved without the necessity of reforming the heretofore practised types of DC motors, particularly their components such as commutators, armature cores, etc. in any way.

In relation to the above objects, a further object of the present invention is to simplify the electrical connection between spark extinguishing electrical elements to be connected between the governor switch contacts and between the commutator segments, and the electrical connections between the governor switch and the commutator segments.

In connection with the object described just above, according to a preferred embodiment of the present invention, a distributing board having the electrical elements to be connected between the governor switch contacts and between the commutator segments, together with the means for holding the governor switches and the commutator, is disposed in a bunch on one side of the rotary shaft of the armature in the axial direction thereof.

Other objects and features of the present invention will become fully apparent from the following detailed description and the accompanying drawings.

BRIEF DESCRIPTION OF THE DRAWINGS

FIGS. 1 to 10 show the constructions of the revolving armature and of the governor device in a prior art DC motor, as well as other components and connections between electrical parts.

FIG. 6 is a schematic view showing the configuration of the insulating plate in FIG. 2.

FIG. 7 is a schematic view showing the construction of the governor device 6 in FIGS. 1, 2 and 4.

FIGS. 11 to 19 shows the constructions of the revolving armature and the governor device in an embodiment of the DC motor according to the present invention, as well as other components and connections between electrical parts.

DESCRIPTION OF THE PREFERRED EMBODIMENTS

Before an embodiment of the DC motor according to the present invention is described, the revolving armature and governor device in the prior art DC motors will first be considered as to their constructions. FIGS. 1 to 10 illustrate the constructions of such revolving armatures and governor devices and other components of the prior art DC motor, as well as the connections between various electrical parts. The construction of the revolving armature is particularly shown in FIGS. 1 to 3, where reference numeral 1 designates the rotary shaft of the armature, 2 armature coils each comprising a lead wire uniformly wound around each salient pole of an iron core 3 formed of soft magnetic material or the like, and 4 a commutator secured to the rotary shaft 1 with an insulating member interposed therebetween and having commutator segments 4a and riser portions 4b. Designated by 5 is a printed distributing board secured to the rotary shaft 1, and designated by 6 is a governor device also secured to the rotary shaft 1. Interposed between the governor device 6 and the printed distributing board 5 is an insulating plate 7 which takes on the configuration as shown in FIG. 6.

Figure 4:
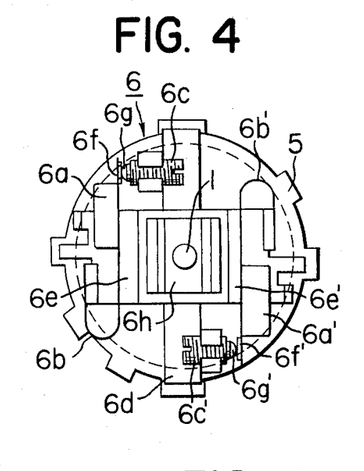
FIG. 4 is a right-hand side view of the armature as seen in the direction of arrows III—III in FIG. 2.

Details of the governor device 6 are particularly shown in FIGS. 4 and 7. As shown there, a conductor piece $6d$ and two conductor pieces $6e$, $6e'$ are embedded in the base $6h$ of the governor device 6, and in the opposite end portions of the conductor piece $6d$ with the rotary shaft 1 as a boundary, adjustment screws $6c$ and $6c'$ of conductive material extend substantially perpendicularly to the axis of the rotary shaft 1 and are disposed in such a manner that their contact spacings are adjustable as desired. Contacts $6g$ and $6g'$ are attached to the heads of the adjust screws $6c$ and $6c'$.

Leaf springs $6b$ and $6b'$ formed of a conductor are secured to the conductor pieces $6e$ and $6e'$, and weights $6a$, $6a'$ and contacts $6f$, $6f'$ are secured to the free ends of the leaf springs $6b$ and $6b'$, the contacts $6f$ and $6f'$ being biased into engagement with he aforesaid contacts $6g$ and $6g'$ by the resilient forces of the leaf springs $6b$ and $6b'$.

Figure 9:
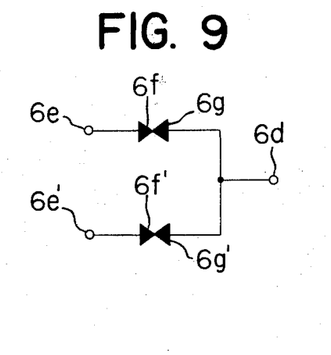
FIG. 9 conceptionally illustrates the manner of connections between the electrical parts of the governor device 6 in FIG. 7.

The manner in which the conductor pieces $6d$, $6e$, $6e'$ and the contacts $6f$, $6g$ and $6f'$, $6g'$ are connected together is shown in FIG. 9, where it is seen that the combination of contacts $6f$–$6g$ and $6f'$–$6g'$ constitute governor switches.

Figure 5:
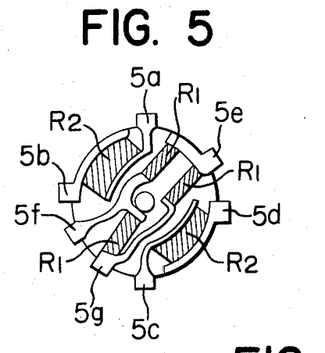
FIG. 5 is a schematic view of the printed distributing board 5 shown in FIGS. 1, 2 and 4.
Figures 6, 7:
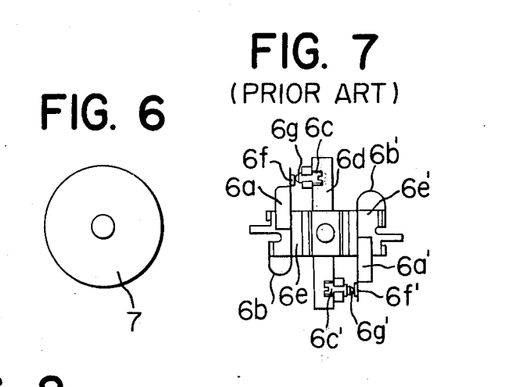
Figure 8:
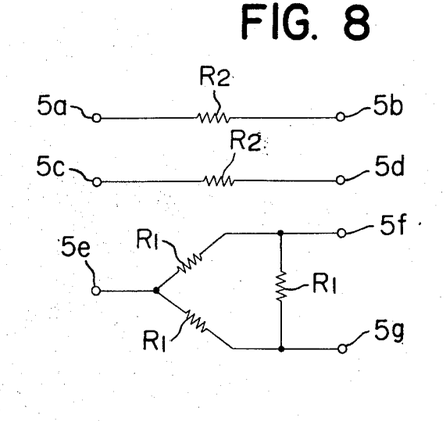
FIG. 8 conceptionally illustrates the manner of connections between the electrical parts of the printed distributing board 5 in FIG. 5.

Details of the printed distributing board 5 are shown in FIG. 5, where resistors R1 for spark extinction are inserted and connected between the commutator segments $4a$, resistors R2 for spark extinction are inserted and connected between the governor switch contacts $6f$–$6g$ and $6f'$–$6g'$, and conductor portions $5a$ to $5g$ are formed on the printed distributing board 5. The conductor portions $5a$, $5b$ and $5c$, $5d$ provide terminals of the resistors R2 while the conductor portions $5e$, $5f$, $5g$ provide terminals of the resistors R1. The manner in which the various electrical elements R1,R2 and $5a$ to $5g$ are connected is shown in FIG. 8.

The electric circuit of the revolving armature constructed as described above is shown in FIG. 10, where one end of each winding forming the armature coil 2 is connected to the riser portions $4b$ of the commutator 4 and the other ends are connected to the governor device 6. Reference numeral 8 designates known brushes in contact with the segments 4a of the commutator 4, and E represents a power source for supplying power to the coils 2.

Figure 1:
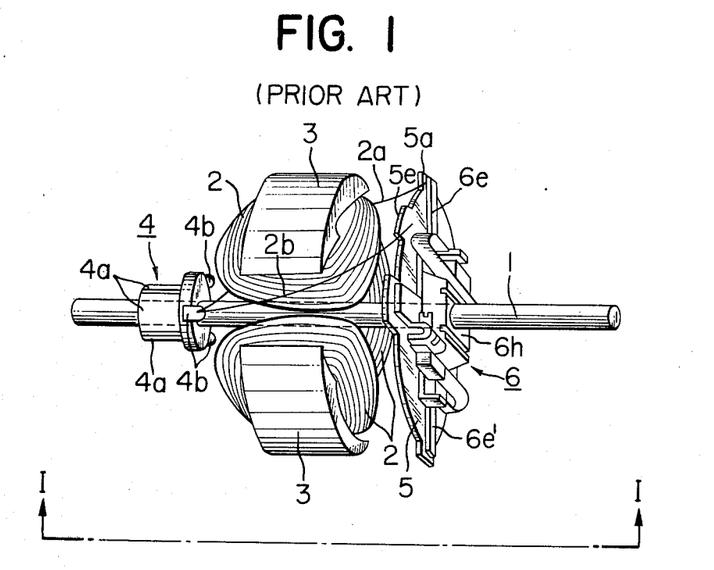
FIG. 1 is a pictorial perspective view showing an example of the revolving armature in the prior art DC motor.
Figure 2:
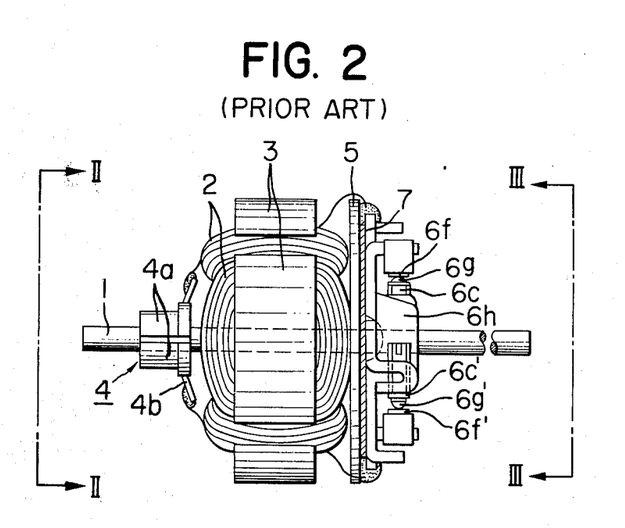
FIG. 2 is a plan view of the armature as seen in the direction of arrows I—I in FIG. 1.
Figure 3:
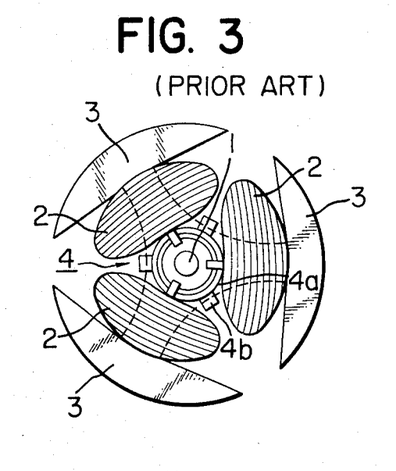
FIG. 3 is a left-hand side view of the armature as seen in the direction of arrows II—II in FIG. 2.
Figure 10:
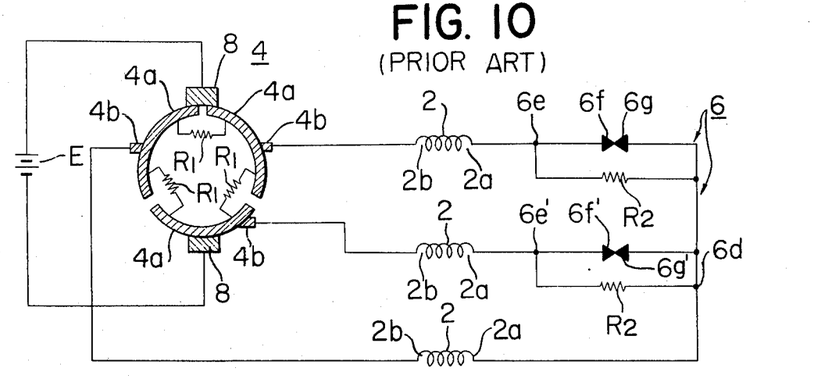
FIG. 10 diagrammatically shows the armature circuit of the revolving armature constructed as shown in FIGS. 1 and 2.

With reference to FIGS. 1 and 10, description will now be made of the method whereby electrical connections among the coils 2, the commutator 4, the printed distributing board 5 and the governor device 6 are made during assembly of the above-described revolving armature. In two of the three armature coils 2 each having the opposite ends 2a and 2b, the ends 2a of their windings are connected to the terminal 5a (FIG. 9) of the spark extinguishing resistor R2 connected between the governor contacts 6f–6g and 6f'–6g' and to the end of the conductor piece 6e (or 6e') of the governor device 6, while the other ends 2b are connected to the riser portions 4b of the commutator 4 and thence to the terminal 5e of the spark extinguishing resistor R1 inserted and connected between the commutator segments 4a formed on the printed distributing board 5. In a third coil, one end 2b thereof is connected in a similar manner to that described above, and the other end 2a is connected to the conductor piece 6d of the governor device 6.

In such method of connection, wiring has been difficult to do because a portion of a single insulated conductor must first be connected to a riser portion 4b and thence to a terminal of the printed distributing board.

Operation of the governor device thus constructed will now be described briefly. The governor contacts 6f, 6g and 6f', 6g' are normally biased into engagement with each other by the elastic forces of the leaf springs 6b and 6b', but as the speed of revolution of the revolving armature is increased, the centrifugal forces acting on the weights 6a and 6a' decrease the elastic forces of the leaf springs 6b and 6b' to permit the speed of revolution to exceed the set level adjusted by the adjust screws 6c and 6c', until the centrifugal forces acting on the weights exceed the elastic forces of the leaf springs 6b and 6b', whereupon the contacts 6f, 6g and 6f', 6g' are brought into a disengaged or open position.

Incidentally, as shown in FIG. 10, the armature current supplied from the power source E to the armature coils 2 through the brushes 8 is serially passed, without fail, through the contacts 6f–6g and 6f'–6g' independently of the relative positions of the brushes 8 and the commutator segments 4a and therefore, the armature current is flowed and cut off in accordance with the speed of revolution of the revolving armature to ensure that the armature revolves at its set speed of revolution.

However, as will be seen in FIGS. 4 and 7, the leaf springs 6b, 6b' and weights 6a, 6a' lie in a plane perpendicular to the rotary shaft 1 and thus, the inertia forces acting on the weights 6a, 6a' during rightward revolution will be opposite in sense to those during leftward revolution due to the angular acceleration, with the result that it has been impossible to adjust the speed of revolution to one and the same number of revolutions for both rightward and leftward rotation.

Thus, in the prior art DC motor having the revolving armature designed as shown in FIGS. 1 to 10, the governor switches are opened and closed in a plane perpendicular to the rotary shaft so that the set number of revolutions differs from rightward to leftward rotation, and this has led to a disadvantage in such revolving armature is not usable with, for example, auto reverse tape recorders or the like. In addition, cumbersome wiring procedures have been involved because the rectifier and the printed distributing board printed with the spark extinguishing resistors connected between the commutator segments are disposed on the axially opposite sides of the rotary shaft with the armature core interposed between the commutator and the distributing board.

Figure 11:
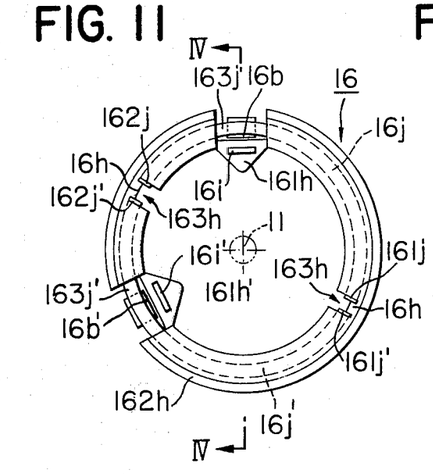
FIG. 11 is a front view of the governor device employed in an embodiment of the DC motor according to the present invention.
Figure 12:
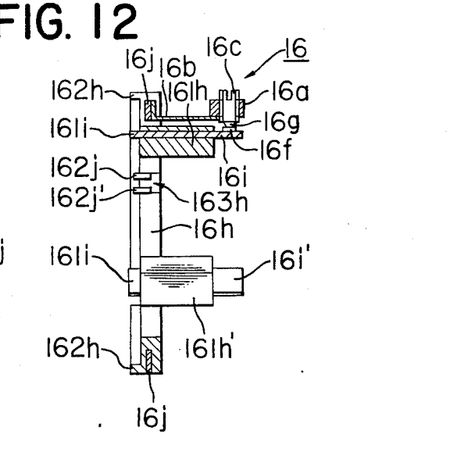
FIG. 12 is a cross-sectional view taken along lines IV—IV in FIG. 11.
Figure 13:
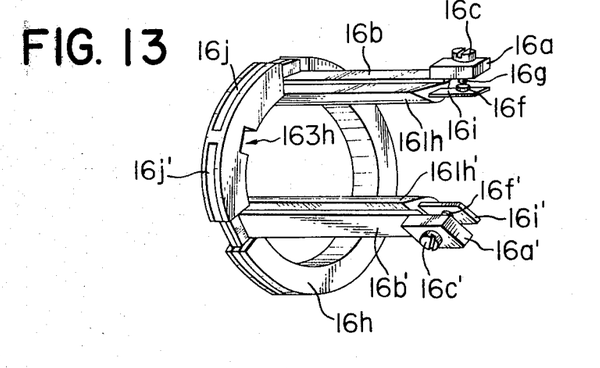
FIG. 13 is a pictorial perspective view of the governor device.

The present invention provides a novel DC motor which can eliminate the above-noted disadvantages peculiar to the prior art DC motors. An embodiment of the DC motor according to the present invention will hereinafter be described by reference to FIGS. 11 to 16. Reference will first be had to FIGS. 11 to 13 to describe the construction of the governor device employed in the DC motor of the present invention. In these figures, reference numeral 11 designates the rotary shaft of the revolving armature shown in FIG. 14, and the governor device is generally designated by 16. Designated by 16h is a governor base formed of non-conductive material which has two projected portions 161h and 161h' projected in the axial direction of the rotary shaft 11 and a cylindrical inner surface portion 162h which is formed substantially annularly about the rotary shaft 11.

Fixed contact support members 16i and 16i' are embedded in the projected portions 161h and 161h' of the governor base 16h and are formed of a conductive material in a planar configuration. The fixed contact support members 16i and 16i' each have one end thereof projected outwardly of the projected portions 161h and 161h' of the governor base 16h in the axial direction of the rotary shaft, and these ends of the support members are provided with fixed contacts 16f and 16f'. The other ends 161i and 161i' of the fixed contact support members are utilized as the terminals of the fixed contacts 16f and 16f'. Designated by 16j and 16j' are movable contact support members embedded in the governor base 16h which are formed of a conductive material and configured like arcuate flat plates. The opposite ends 161j, 162j and 161j', 162j' of the movable contact support members are projected outwardly of recesses 163h in the governor base 16h and are utilized as connecting terminals. Intermediate portions 163j and 163j' of the movable contact support members 16j and 16j' are exposed outwardly of the governor base and leaf springs 16b and 16b' of conductive material are electrically connected and secured to the intermediate portions. These leaf springs 16b and 16b' extend in the axial direction of the rotary shaft 11 and their free ends are electrically connected and secured to weights 16a and 16a' formed of a conductive material. The weights 16a and 16a' are formed with threaded holes into which screws 16c and 16c' of conductive material are threadably received. The screws 16c and 16c' threadably engaged in the threaded holes of the weights 16a and 16a' are movable back and forth in the direction perpendicular to the rotary shaft 11 by being rotated by a driver or like tool. Designated by 16g and 16g' are movable contacts secured to the tip ends of the screws 16c and 16c'. These movable contacts 16g and 16g' and the aforementioned fixed contacts 16f and 16f' are disposed so as to be maintained in contact with each other by the elastic forces of the leaf springs 16b and 16b', and the combination of these contacts 16f–16g and 16f'–16g' constitutes governor switches. It should be noted that the opposite ends 161j, 161j', 162j and 162j' of the movable contact support members 16j and 16j' are utilized as the connecting terminals of the movable contacts 16g and 16g'.

The governor device 16 so constructed and employed with the motor of the present invention operates such that as the speed of revolution of the revolving armature exceeds the set speed of revolution, the centrifugal forces acting on the weights 16a and 16a' are increased to shift the contacts 16f-16g and 16f'-16g' from their engaged position to their disengaged position against the elastic forces of the leaf springs 16b and 16b', thereby holding the rotational speed of the revolving armature at the set speed of revolution. When this occurs, the fixed and the free ends of the leaf springs 16b and 16b' lie in the plane containing the axis of the rotary shaft 11, so that the contacts 16f, 16g and 16f', 16g' are opened and closed in the plane containing the axis of the rotary shaft 11, with the result that any variation in the set speed of revolution is eliminated even for any variation in the direction of rotation of the armature.

Figure 14:
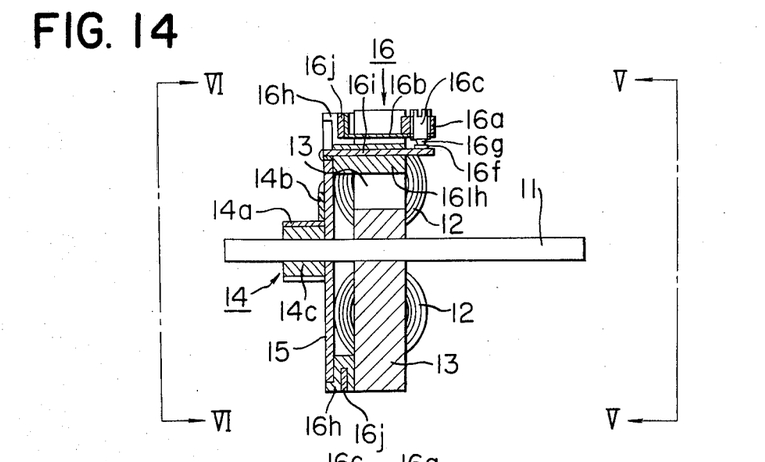
FIG. 14 shows, in cross-section, the revolving armature in an embodiment of the DC motor according to the present invention provided with the governor device constructed as shown in FIGS. 11 to 13.
Figure 15:
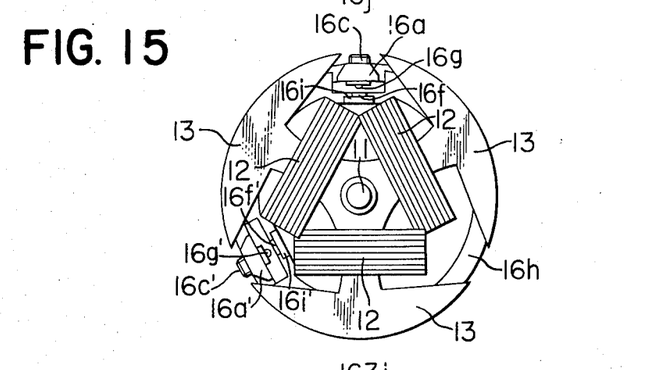
FIG. 15 is a right-hand side view of the entire revolving armature as seen in the direction of arrows V—V in FIG. 14.
Figure 16:
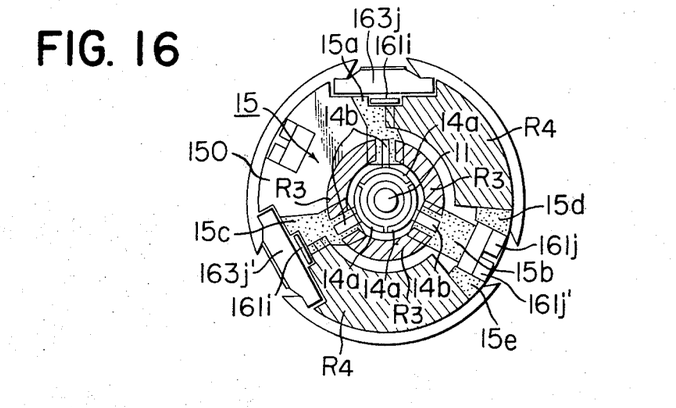
FIG. 16 is a left-hand side view of the armature, especially, the printed distributing board 15, as seen therethrough in the direction of arrows VI—VI in FIG. 14.

Description will now be made of an example of the motor provided with the above-described governor device 16. FIGS. 14 to 16 illustrate the construction of the motor provided with such governor device 16, and particularly of the revolving armature thereof. In these figures, reference numeral 14 designates a commutator secured to the rotary shaft 11 of the armature. The commutator 14 comprises three commutator segments 14a and three commutator risers 14b electrically connected to the respective commutator segments 14a, and the configuration thereof is particularly shown in FIG. 16.

Designated by 15 is a printed distributing board on which there are formed spark extinguishing electrical parts to be inserted and connected between adjacent ones of the three commutator segments 14a and spark extinguishing electrical parts to be inserted and connected between the governor contacts 16f-16g and 16f'-16g'. The printed distributing board 15 is secured to the rotary shaft 11 by means of the commutator 14.

Reference numeral 12 designates armature coils comprising windings coiled on the three salient poles of armature core 13 which is secured to the rotary shaft 11.

A governor base 16h has its cylindrical portion 162h fitted around the outer periphery of the printed distributing board 15, and has its projected portions 161h and 161h' secured to the side surface of the armature core 13 as by adhesive. Thus, in the motor of the present invention, the projected portions 161h and 161h' of the governor base 16h extending in the axial direction of the revolving shaft, together with leaf springs, are disposed in the space between the salient poles of the armature core 13 and this can extremely reduce the dimensions of the revolving armature in the axial direction of the rotary shaft.

In the above-described embodiment, the armature core has three salient poles and two sets of governor contacts, whereas the motor of the present invention is not restricted to such embodiment but the number of the salient poles and of the governor contacts may be altered as required.

Figure 17:
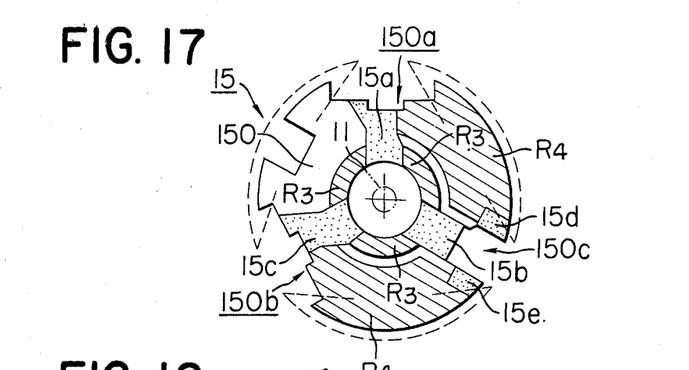
FIG. 17 is a plan view showing in detail the arrangement of various electrical elements on the printed distributing board.

Details of the arrangement of various electrical elements on the printed distributing board are shown in FIGS. 16 and 17, where numeral 150 designates the base plate of the printed distributing board 15, and 15a to 15e designate conductor portions formed on the base plate 150. Formed between the conductor portions 15a and 15b, 15b and 15c, and 15c and 15a are first electrical elements R3 such as resistors, capacitors or the like (hereinafter described as resistors) connected between adjacent ones of the segments 14a of the commutator 14 for extinguishing any spark produced between these segments. Formed between the conductor portions 15a and 15d and between the conductor portions 15c and 15e are second electrical elements R4 (hereinafter described as resistors like the first electrical elements R3) connected between the governor contacts 16f-16g and 16f'-16g' of the governor device 16 for extinguishing any spark produced between these contacts. Cut-aways 150a to 150c are formed in predetermined portions of the base plate 150. The cut-aways 150a and 150b respectively receive therein the end portions 161i, 161i' of the support members 16i, 16i' supporting the fixed contacts 16f, 16f' of the governor device 16, and the cut-away 150c receives therein the end portions 161j, 161j' of the support members 16j, 16j' supporting the movable contacts 16g, 16g'.

The conductor portions 15a to 15e and the resistors R3 and R4 may be formed on the base plate 150 as by printing or similar method.

Figure 18:
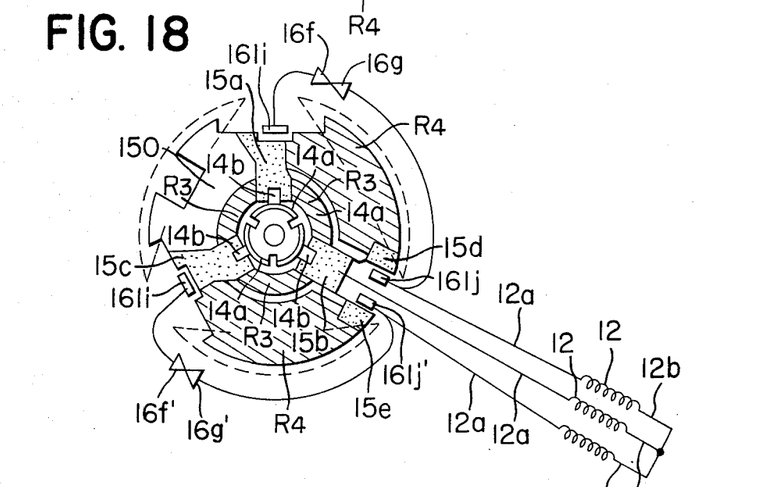
FIG. 18 is a schematic view showing the manner of electrical connections between the armature coils 12 and the commutator 14, and the governor device 16 and the printed distributing board 15.

The method whereby electrical connections are made between the armature coils 12, the commutator 14, the governor device and the printed distributing board 15 during assembly of the above-described revolving armature will now be described with reference to FIGS. 16 and 18. As shown there, the conductor portions 15a, 15b and 15c of the printed distributing board 15 are formed in those locations of the printed distributing board corresponding to the three risers 14b of the rectifier 14, so that if the risers 14b and the conductor portions 15a, 15b and 15c are abutted and connected together as by soldering, the insertion and connection of the resistors R3 between the adjacent ones of the segments 14a of the commutator 14 may be accomplished.

On the other hand, the governor device 16 is such that the ends 161i, 161i' of support members 16i, 16i' supporting the fixed contacts 16f, 16f' thereof are respectively inserted in cut-aways 150a, 150b formed in the base plate 150 of the printed distributing board 15 and that the ends 161j, 161j' of support members 16j, 16j' supporting the movable contacts 16g, 16g' are inserted in the cut-away 150c formed in the base plate 150. The ends 161i, 161i' of the fixed contact support members 16i, 16i' are proximate to the conductor portions 15a, 15c of the printed distributing board 15 within the cut-aways 150a and 150b, and in such position, they are connected to the conductor portions 15a and 15c as by soldering. Also, the ends 161j, 161j' of the movable contact support members 16j, 16j' are respectively proximate to the conductor portions 15d, 15e of the printed distributing board 15 within the cut-aways 150c, and in such position they are connected to the conductor portions 15d, 15c, with the ends 12a of the windings of two of the three armature coils 12, as by soldering. Thus, as schematically shown in FIG. 18, the insertion and connection of the resistors R4 between the governor contacts 16f-16g and 16g-16g' and the connection of the armature coils 12 to the governor contacts 16f-16g and 16f'-16g' may be accomplished. The remaining one of the armature coils 12 has one end 12a of the winding thereof connected to the conductor portion 15b of the printed distributing board 15 as by soldering, and the other ends 12b of the three coils are connected in common.

Figure 19:
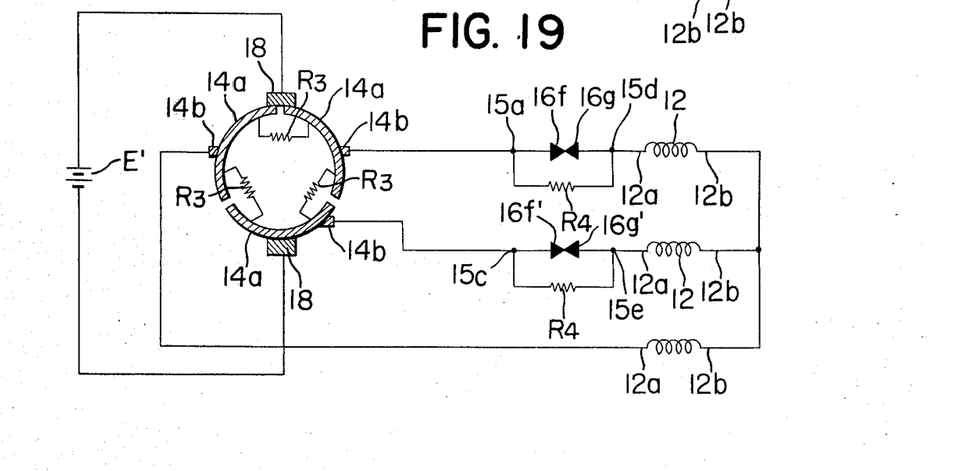
FIG. 19 is a connection diagram showing the armature circuit of the revolving armature.

Thus, the electrical connections between the armature coils 12, the commutator 14, the governor device 16 and the printed distributing board 15 during assembly of the revolving armature has been completed, and the manner of connections in the armature circuit so provided is diagrammatically shown in FIG. 19. In FIG. 19, numeral 18 denotes known brushes for contacting the segments 14a of the commutator 14 to supply electric current to the armature coils 12 through the commutator 14. The brushes 18 are connected to a DC power source E'.

Operation of the DC motor of the present invention provided with the above-described revolving armature will now be described. In FIG. 19, if power is supplied from the power source E' to the armature coils 12 through the brushes 18, the armature current will always flow through the governor contacts 16f-16g and 16f'-16g' and through the coils 12 to cause the armature to revolve in the known manner. As the speed of revolution of the armature is increased so that the centrifugal forces exerted on the a, 16a,16a' overcome the elastic forces of the leaf springs 16b, 16b', the governor contacts 16f-16g and 16f'-16g' are brought into disengaged or opened position to cut off the power supply to the coils 12, and the armature continues to revolve from its own inertia force. As the speed of revolution is decreased so that the centrifugal forces exerted on the weights 16a, 16a' become lower than the elastic forces of the leaf springs 16b, 16b', the governor contacts 16f-16g and 16f'-16g' are again engaged to permit power supply to the coils 12 as already described. Therefore, by preadjusting the contact pressure by way of the adjustment screws 16c and 16c' so that the disengagement of the governor contacts 16f-16g and 16f'-16g' occurs at a predetermined speed of revolution, the rotational speed of the motor may always be controlled to a predetermined value independently of the direction of rotation.

In the DC motor of the present invention, as has been hitherto described in detail, the governor switches of the governor device are disposed by utilization of the space in the winding slot portions of the armature, and the connecting terminal portions of the governor switches are located in proximity to the commutator on the same side that the commutator is disposed with respect to the armature coils. This ensures that the speed of revolution of the armature will be controlled at a predetermined level. As a result, the motor of the present invention is suitable for use in auto reverse tape recorders and the like, and the procedures of making connections between the electrical parts during the assembly of the motor will become pronouncedly simplified. Moreover, the dimensions of the armature in the axial direction of the rotary shaft may be reduced to extremely reduce the size of the entire motor.

Particularly, even in the cases where, as in the illustrated embodiment, there is provided the printed distributing board having spark extinguishing electrical elements inserted and connected between the commutator segments and between the governor contacts, it is possible to arrange the commutator, the printed distributing board and the connecting terminals of the governor device closely adjacent to one another on one side of the armature core, and this contributes to simplification of the wiring procedures between these elements and greater ease of the manufacture.

We claim:

1. A DC motor comprising:
   a rotary shaft;
   an armature core having a plurality of salient poles and secured to said rotary shaft;
   armature windings coiled on said salient poles;
   a commutator electrically connected to said windings and secured to said rotary shaft;
   switch means capable of cutting off the current flow path to said windings and disposed between said salient poles of said core and operable to be opened and closed by centrifugal force in a plane containing the axis of said rotary shaft, said switch means being electrically connected in the current flow path to said windings; and
   means for supporting said switch means between said salient poles of said core and disposed with respect to said windings on the same side that said commutator is disposed, said support means including means for electrically connecting said switch means in the current flow path to said windings and electrically connected to said switch means;
   whereby the speed of revolution of said motor may be made constant independently of the direction of revolution.

2. A DC motor according to claim 1, wherein said switch means includes:
   first and second contacts held in engagement by elastic force and electrically connected in the current flow path to said windings; and
   conductive elastic members for holding said first and second contacts in engagement, said elastic members supporting said first contacts and being electrically connected thereto.

3. A DC motor according to claim 2, wherein means in said support means for connecting said switch means includes:
   first conductive members for supporting said elastic members of said switch means and electrically connected to said elastic members; and
   second conductive members for supporting the second contacts of said switch means and electrically connected to said second contacts.

4. A DC motor according to claim 3, wherein said support means further includes:
   first nonconductive members for holding said first conductive members and formed in an annular shape centered about the axis of said rotary shaft, said first nonconductive members being disposed with respect to said windings on the same side that said commutator is disposed; and
   second nonconductive members for holding said second conductive members, said second nonconductive members being projected between said salient poles of said core and secured to said first nonconductive members.

5. A DC motor according to claim 2, wherein said switch means further includes:
   means for adjusting the contact pressure between said first and second contacts and provided to said elastic members.

6. A DC motor according to claim 2, wherein said switch means further includes:
   conductive weight members secured to said elastic members.

7. A DC motor according to claim 6, wherein said switch means further includes:
   screw members for adjusting the contact pressure between said first and second contacts, said screw members being formed of a conductive material and threadably fitted to said weight members, said first contacts being secured to said screw members.

8. A DC motor according to claim 1, wherein said armature core has at least three salient poles and said switch means includes:
at least two switches disposed between said salient poles of said core and operable to be opened and closed by centrifugal force, said switches being connected in the current flow path to discrete ones of said windings.

9. A DC motor comprising:
a rotary shaft;
an armature core having a plurality of salient poles and secured to said rotary shaft;
armature windings coiled on said salient poles;
a commutator electrically connected to said windings and secured to said rotary shaft;
switch means capable of cutting off the current flow path to said windings and disposed between said salient poles of said core and operable to be opened and closed by centrifugal force in a plane containing the axis of said rotary shaft, said switch means being electrically connected in the current flow path to said windings;
a distributing board having electrical means for extinguishing any spark produced by said commutator and said switch means, said distributing board being disposed with respect to said windings on the same side that said commutator is disposed;
said commutator being electrically connected to said electrical means; and
means for supporting said switch means between the salient poles of said core and disposed with respect to said windings on the same side tht said commutator is disposed, said support means including:
means for electrically connecting said switch means in the current flow path to said windings and to said electrical means of said distributing board, said means being electrically connected to said switch means.

10. A DC motor according to claim 9, wherein said armature core has at least three salient poles, said armature windings are coiled separately on said salient poles, and said commutator includes:
a plurality of conductor pieces corresponding in number and electrically connected to said windings.

11. A DC motor according to claim 10, wherein said electrical means on said distributing board includes:
resistors corresponding in number to said conductor pieces of said commutator and inserted and connected between said pieces.

12. A DC motor according to claim 11, wherein said distributing board further includes:
conductive portions provided correspondingly to said conductor pieces of said commutator and electrically connected to said resistors, said conductor pieces of said commutator being electrically connected to said conductive portions, respectively.

13. A DC motor according to claim 10, wherein said switch means includes:
at least two switches disposed between the salient holes of said core and operable to be opened and closed by centrifugal force, said switches being electrically connected to discrete ones of said windings, respectively.

14. A DC motor according to claim 13, wherein said electrical means on said distributing board includes:
resistors corresponding in number and electrically connected to said switches in said switch means.

15. A DC motor according to claim 14, wherein said distributing board further includes:
conductive portions provided correspondingly to the means in said support means for connecting said switching means, said conductive portions being electrically connected to said resistor, said connecting means being electrically connected to said conductive portions.

16. A DC motor comprising:
a rotary shaft;
an armature core having a plurality of salient poles and secured to said rotary shaft, said core being formed of soft magnetic material;
armature windings coiled on said salient poles of said core;
a commutator electrically connected to said windings and secured to said rotary shaft, said commutator including:
a plurality of conductor pieces provided correspondingly to said windings and electrically connected thereto;
switch means capable of cutting off the current flow path to said windings and disposed between said salient poles of said core and operable to be opened and closed by centrifugal force in a plane containing the axis of said rotary shaft, said switch means being electrically connected in the current flow path to said windings, said switch means including:
first and second contacts held in engagement by elastic force and electrically connected in the current flow path to said windings; and
conductive elastic members for holding said first and second contacts in engagement, said elastic members supporting said first contacts and being electrically connected thereto;
a distributing board having first electrical means for extinguishing any spark produced by said commutator and second electrical means for extinguishing any spark produced by said switch means, said distributing board being disposed with respect to said windings on the same side that said commutator is disposed, said first electrical means being electrically connected between the conductor pieces of said commutator;
means for supporting said switch means and including:
first nonconductive members formed in an annular shape centered about the axis of said rotary shaft, said first nonconductive members being disposed with respect to said windings on the same side that said commutator is disposed;
second nonconductive members projectedly provided between said salient poles and secured to said first nonconductive members;
first conductive members supporting the elastic members of said switch means and held by said first nonconductive members; and
second conductive members supporting said second contacts of said switch means and held by said second nonconductive members;
the first and second contacts of said switch means being electrically connected in the current flow path to said windings and to said second electrical means of said distributing board through said first and second conductive members of said support means.

17. A DC motor comprising:
a rotary shaft;
an armature core having a plurality of salient poles and secured to said rotary shaft, said core being formed of soft magnetic material;
armature windings coiled on said salient poles of said core;
a commutator electrically connected to said windings and secured to said rotary shaft, said commutator including:
a plurality of conductor pieces provided correspondingly to said windings and electrically connected thereto;
switch means capable of cutting off the current flow path to said windings and disposed between said salient poles of said core and operable to be opened and closed in a plane containing the axis of said rotary shaft, said switch means being electrically connected in the current flow path to said windings;
means for supporting said switch means between said salient poles of said core and disposed with respect to said windings on the same side that said commutator is disposed, said support means including means for electrically connecting said switch means in the current flow path to said windings and electrically connected to said switch means; and
a printed distributing board disposed with respect to said windings on the same side that said commutator is disposed, said distributing board including:
first electrical means for extinguishing any spark produced between the conductor pieces of said commutator;
first conductive portions provided correspondingly to said conductor pieces of said commutator and electrically connected to said first electrical means, said conductor pieces of said commutator being electrically connected to said first conductive portions;
second electrical means for extinguishing any spark produced by said switch means; and
second conductive portions provided correspondingly to the means in said support means for connecting said switch means, said second conductive portions being electrically connected to said second electrical means, said connecting means being electrically connected to said second conductive portions.

18. A revolution speed control device in a DC motor provided with a rotary shaft, an armature core having a plurality of salient poles and secured to said rotary shaft, armature windings coiled on said salient poles of said core, and a commutator secured to said rotary shaft and electrically connected to said windings, said device comprising:
switch means capable of cutting off the current flow path to said windings and disposed between said salient poles of said core and operable to be opened and closed by centrifugal force in a plane containing the axis of said rotary shaft, said switch means being electrically connected in the current flow path to said windings, said switch means including:
first and second contacts held in engagement by elastic force and electrically connected in the current flow path to said windings; and
conductive elastic members for holding said first and second contacts in engagement, said elastic members supporting said first contacts and being electrically connected thereto;
means for supporting said switch means and including:
first nonconductive members formed in an annular shape centered about the axis of said rotary shaft, said first nonconductive members being disposed with respect to said windings on the same side that said commutator is disposed;
second nonconductive members projectedly provided between said salient poles and secured to said first nonconductive members;
first conductive members supporting the elastic members of said switch means and held by said first nonconductive members; and
second conductive members supporting said second contacts of said switch means and held by said second nonconductive members;
said first and second conductive members being electrically connected in the current flow path to said windings.

* * * * *

UNITED STATES PATENT OFFICE
CERTIFICATE OF CORRECTION

Patent No. 4,015,181          Dated March 29, 1977

Inventor(s) Yukuo Karube and Koji Suzuki

It is certified that error appears in the above-identified patent and that said Letters Patent are hereby corrected as shown below:

Col. 7, line 14, "16f" to read -- 16f' --;

Col. 9, line 21, "a" to read -- weights --;

Col. 11, line 34, "tht" to read -- that --.

Signed and Sealed this nineteenth Day of July 1977

[SEAL]

Attest:

RUTH C. MASON
*Attesting Officer*

C. MARSHALL DANN
*Commissioner of Patents and Trademarks*